US012783260B2

(12) United States Patent
Dar et al.

(10) Patent No.: US 12,783,260 B2
(45) Date of Patent: Nov. 3, 2026

(54) INTERCEPTING CALLS TO A DYNAMIC LIBRARY

(71) Applicant: Nvidia Corporation, Santa Clara, CA (US)

(72) Inventors: Ronen Dar, Even Yehuda (IL); Raz Rotenberg, Givatayim (IL); Noa Neria, Tel Aviv (IL); Menny Hamburger, Nes Ziona (IL); Yoed Ginzburg, Rosh HaAyin (IL)

(73) Assignee: Nvidia Corporation, Santa Clara, CA (US)

( * ) Notice: Subject to any disclaimer, the term of this patent is extended or adjusted under 35 U.S.C. 154(b) by 631 days.

(21) Appl. No.: 17/877,958

(22) Filed: Jul. 31, 2022

(65) Prior Publication Data

US 2024/0036887 A1 Feb. 1, 2024

(51) Int. Cl.
*G06F 9/445* (2018.01)

(52) U.S. Cl.
CPC ................................ *G06F 9/44521* (2013.01)

(58) Field of Classification Search
None
See application file for complete search history.

(56) References Cited

U.S. PATENT DOCUMENTS 9,348,488 B1 * 5/2016 Renema .............. G06F 3/04817
9,898,615 B1 * 2/2018 Evans ..................... G06F 21/53
2005/0039195 A1 * 2/2005 Hunt ..................... G06F 9/4484 712/E9.082
2006/0282840 A1 * 12/2006 Stone .................. G06F 9/44552 719/331
2007/0006202 A1 * 1/2007 Mikkelsen .......... G06F 9/44552 717/163
2007/0022417 A1 * 1/2007 Holloway ............... G06F 21/54 717/162
2010/0299659 A1 * 11/2010 Kirshnaswamy ....... G06F 9/445 717/162

(Continued)

OTHER PUBLICATIONS

W3Cook, "OS Market Share and Usage Trends," pp. 1-2, Aug. 6, 2015, as downloaded from https://web.archive.org/web/20150806093859/http://www.w3cook.com/os/summary/.

(Continued)

*Primary Examiner* — Umut Onat
(74) *Attorney, Agent, or Firm* — Meitar Patents LTD.; Daniel Kligler

(57) ABSTRACT

A method, including loading, to a first address in a memory of a computer, an interposing method having an interposing name that is identical to an original name of an original method in a library of original methods that are to be dynamically loaded by a software application running on the computer, and identifying a second address in the memory of a dynamic linking method associated with the library. A request is then intercepted from the application, the request including a specified name for one of the methods in the library. When the specified name matches the interposing name, the application is directed to the first address so as to run the interposing method. However, when the specified name does not match any interposing name, the application is directed to the second address so as to run the dynamic linking method to run one of the original methods.

18 Claims, 6 Drawing Sheets

(56) References Cited

U.S. PATENT DOCUMENTS

| | | | | |
|---|---|---|---|---|
| 2015/0156202 | A1* | 6/2015 | Clark | G06F 21/604 726/4 |
| 2020/0117483 | A1* | 4/2020 | Greenfield | G16B 50/50 |
| 2022/0019517 | A1* | 1/2022 | DeMonner | G06F 11/3466 |
| 2022/0321587 | A1* | 10/2022 | Guntar | G06F 16/9027 |

OTHER PUBLICATIONS

Wikipedia, "Library (Computing)," pp. 1-12, Mar. 4, 2022, as downloaded from https://web.archive.org/web/20220321155835/https://en.wikipedia.org/wiki/Library_(computing).
Microsoft, "Advantages of Dynamic Linking," p. 1-1, Jul. 1, 2021, as downloaded from https://web.archive.org/web/20211125225433/https://docs.microsoft.com/en-us/windows/win32/dlls/advantages-of-dynamic-linking.
Linux, "dlopen(3)—Linux manual page," pp. 1-9, Mar. 22, 2021, as downloaded from https://man7.org/linux/man-pages/man3/dlopen.3.html.
Baeldung, "What is the LD_Preload Trick?", pp. 1-11, Aug. 9, 2020, as downloaded from https://www.baeldung.com/linux/ld_preload-trick-what-is#2-interposing-using-ldpreload.
Wikipedia, "Dynamic Linker," pp. 1-5, last updated Jun. 18, 2022, as uploaded from https://en.wikipedia.org/wiki/Dynamic_linker#Systems_using_ELF.
Wikipedia, "DLL Injection," pp. 1-10, last updated Jun. 3, 2022, as uploaded from https://web.archive.org/web/20220606175618/https://en.wikipedia.org/wiki/DLL_injection.
Schneider, "What is preloading?", blog, pp. 1-5, Jul. 21, 2014, as downloaded from https://blog.cryptomilk.org/2014/07/21/what-is-preloading/.
Iftikhar, "What is LD_LIBRARY_PATH used for?", Linux Hint LLC, pp. 1-7, year 2021, as downloaded from https://linuxhint.com/what-is-ld-library-path/.
Wikipedia, "Executable and Linkable Format," pp. 1-17, last updated May 25, 2022, as downloaded from https://web.archive.org/web/20220527210846/https://en.wikipedia.org/wiki/Executable_and_Linkable_Format.

* cited by examiner

INTERCEPTING CALLS TO A DYNAMIC LIBRARY

FIELD OF THE INVENTION

The present invention relates generally to dynamic libraries, and specifically to intercepting and redirecting calls to one or more specified methods in a dynamic library.

BACKGROUND OF THE INVENTION

A software library comprises a collection of software elements (e.g., functions or methods) that has a well-defined interface by which the elements can be invoked. The added value of a software library lies in the reuse of standardized program elements. When a software application invokes a library, the software application gains the behavior of the program elements implemented inside that library without having to implement or reimplement the program elements.

There are two types of libraries which define the lifecycle phase at which a software application can be connected (i.e., linked or loaded) to a software library: static and dynamic. A static library is connected to the software application at build time, while a dynamic library is connected to the invoking software application after the executable has been invoked to be executed.

There are many advantages to using a dynamic library. One advantage is separating the distribution of software applications from the distribution of their respective libraries. When a dynamic library is changed, software applications that use it do not need to be recompiled or relinked. In contrast, updated versions of a static library require any software applications using it to be relinked to the updated version.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method for controlling operation of a computer, the method including loading, to a first address in a memory of the computer, an interposing method having an interposing method name that is identical to an original method name of an original method in a library of original methods that are to be dynamically loaded by a software application running on the computer, identifying a second address in the memory of a dynamic linking method that is associated with the library, intercepting a request from the software application, the request including a specified method name for one of the methods in the library, when the specified method name matches the interposing method name, directing the software application to the first address so as to run the interposing method, and when the specified method name does not match any interposing method name, directing the software application to the second address so as to run the dynamic linking method to run one of the original methods.

In one embodiment, the method further includes loading, from a storage device, the interposing method prior to loading the library of original methods.

In another embodiment, loading the library includes dynamically linking the library to the software application.

In an additional embodiment, loading the library includes dynamically loading the library so as to connect the library to the software application.

In a further embodiment, the library includes an Executable and Linkable Format (ELF) library.

In a supplemental embodiment, the intercepted request includes a dlsym( ) all.

In one embodiment, the method further includes loading, from a storage device, a system library including the dynamic linking method prior to loading the library of original methods.

In some embodiments, identifying the second address includes computing an offset of the dynamic linking method in the system library on the storage device, identifying, in the memory, a base address for the loaded system library, and adding the offset to the base address.

In other embodiments, the system library includes libsdl.so, and wherein the dynamic linking method includes dlsym( ).

In embodiment, running the interposing method includes calling, with one or more parameters, the original method having the identical original method name, receiving a result from the called original method, and performing an operation on the received result.

In another embodiment, the operation includes profiling the original method.

In a first operation embodiment, the operation includes debugging the original method.

In a second operation embodiment, the operation includes instrumenting the original method.

In a third operation embodiment, the operation includes adding functionality to the original method.

There is also provided, in accordance with an embodiment of the present invention, an apparatus including a memory, and a processor configured to load, to a first address in the memory of the computer, an interposing method having an interposing method name that is identical to an original method name of an original method in a library of original methods that are to be dynamically loaded by a software application running on the computer, to identify a second address in the memory of a dynamic linking method that is associated with the library, to intercept a request from the software application, the request including a specified method name for one of the methods in the library, when the specified method name matches the interposing method name, to direct the software application to the first address so as to run the interposing method, and when the specified method name does not match any interposing method name, to direct the software application to the second address so as to run the dynamic linking method to run one of the original methods.

There is additionally provided, in accordance with an embodiment of the present invention, a computer software product for controlling operation of a computer, including a non-transitory computer-readable medium, in which program instructions are stored, which instructions, when read by a computer, cause the computer to load, to a first address in a memory of the computer, an interposing method having an interposing method name that is identical to an original method name of an original method in a library of original methods that are to be dynamically loaded by a software application running on the computer, to identify a second address in the memory of a dynamic linking method that is associated with the library, to intercept a request from the software application, the request including a specified method name for one of the methods in the library, to direct the software application to the first address so as to run the interposing method, and when the specified method name does not match any interposing method name, to direct the software application to the second address so as to run the dynamic linking method to run one of the original methods.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
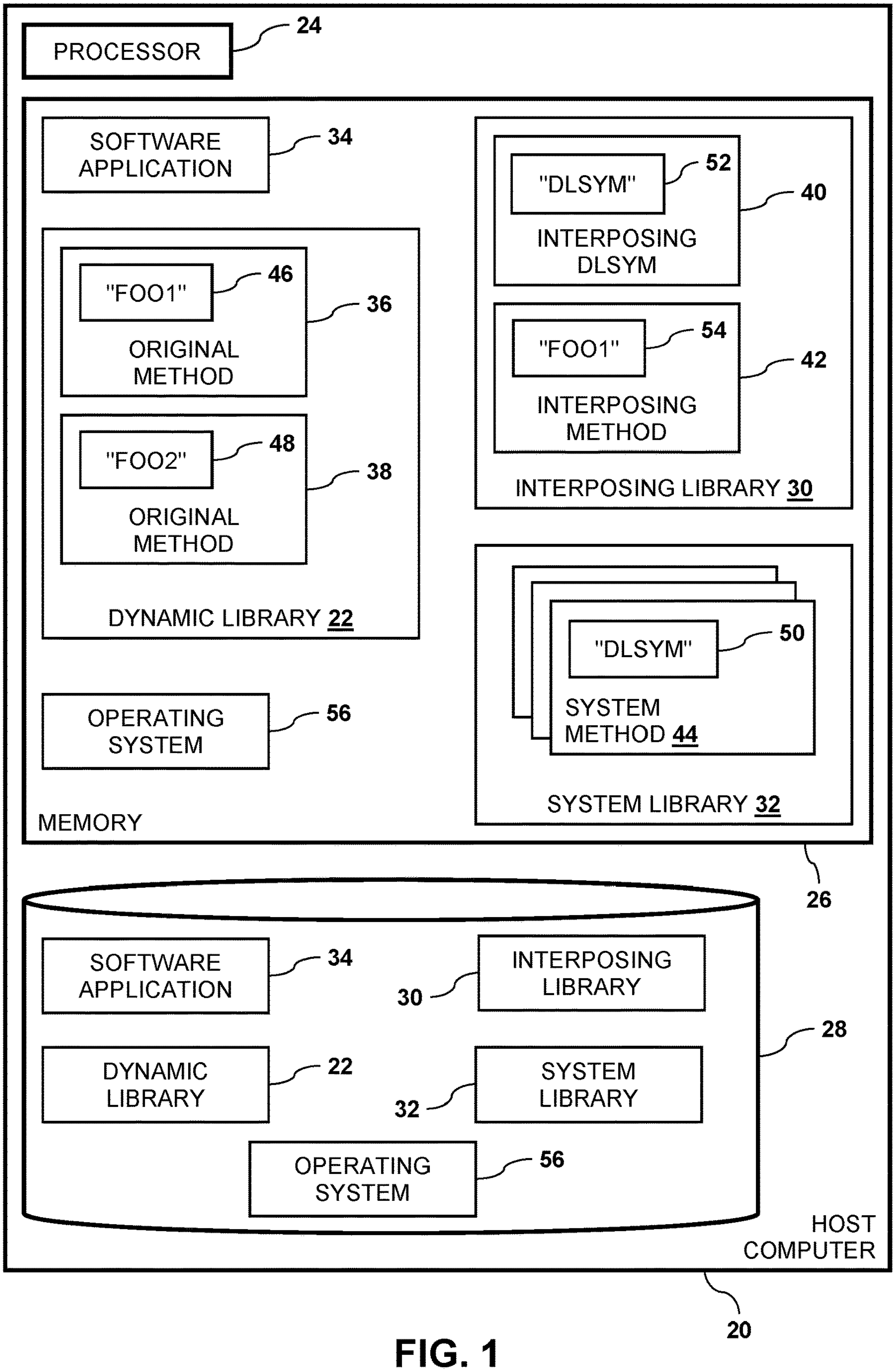
FIG. 1 is a block diagram that schematically shows a host computer comprising a memory and a storage device, and configured to interpose (i.e., intercept and redirect) a subset of calls to a dynamic library to a preloaded library, in accordance with an embodiment of the present invention.

A dynamic library typically comprises a set of methods (i.e., functions) that can be connected to a software application during runtime (i.e., of the software application), and dynamic linking and dynamic loading are two different techniques that can be used to connect the software application to the dynamic library. In response to receiving a request to execute a software application, dynamic linking typically comprises a linker preparing (i.e., in real-time) the software application for execution by loading and linking a dynamic library to the software application.

In dynamic loading, a software application may explicitly request, during execution, that a dynamic library be loaded. In LINUX™ environments, dynamic loading can be implemented using the dlopen( ) and dlsym( ) methods. The dlopen( ) method loads a specific dynamic library indicated by a passed library name parameter, and the dlsym( ) method returns an address of a specific method indicated by a passed method name parameter.

There are instances when a software developer may want to replace a library implementation at runtime and change the behavior of the library, thereby changing the behavior of the software application (i.e., that calls any method in the library) as well. For example, the developer may want to add some accounting functionality to a memory allocation function such as malloc( ). Other reasons to replace a library implementation at runtime include, but are not limited to, profiling, debugging, fixing bugs (i.e., detected during debugging) and monitoring/instrumenting the methods in a given library.

To replace a given method (having a given name) in a given dynamic library, a software developer can generate an "interposing" version of the given method (i.e., the "intended" method) with the same name. The goal is to have the interposing method intercept calls to the given method. In some embodiments, upon intercepting the call to the given method, the interposing method have the interposing method call the given method (with any intercepted parameters and/or any other parameters), and receive, from the called given method, a response to the call. In these embodiments, the interposing method can then perform operations (e.g., instrumenting as described supra) based on any input parameters or results from the given function. When interposing a given method in a LINUX™ environment, the interposing method typically needs prior "knowledge" of the memory address and the signature (i.e., input parameter information such as a number of input parameters and their respective formats) for the given method.

Embodiments of the present invention provide methods and systems for interposing (i.e., intercepting and redirecting) calls to a subset of methods in a given library. As described hereinbelow, an interposing method is loaded to a first address in a memory of the computer, the interposing method having an interposing method name that is identical to an original method name of an original method in a library of original methods that are to be dynamically loaded by a software application running on the computer. A second address in the memory of a dynamic linking method that is associated with the library is identified, thereby completing system initialization.

A request is intercepted from the software application, the request comprising a specified method name for one of the methods in the library. When the specified method name matches the interposing method name, the software application is directed to the first address so as to run the interposing method. When the specified method name does not match any interposing method name, the software application is directed to the second address so as to run the dynamic linking method to run one of the original methods.

Systems implementing embodiments of the present invention can be configured to execute two distinct instances of the dynamic linking method, that may comprise respective instances of the dlsym( ) method in LINUX™ based systems. The first instance of the dynamic linking method can be configured to perform the steps of intercepting the request and directing the software application to the first address, as described supra. The second instance of the dynamic linking method may comprise the dynamic linking method at the second memory address, which may comprise a stock (i.e., non-modified) version of dlsym( ) as described supra.

One important feature of systems implementing embodiments of the present invention, is that the first instance of the dynamic linking method described supra only needs to be able to call (e.g., by having the memory address and signature) the interposing method. The first instance of the dynamic linking method does not need to have any information (i.e., other than the method names) of any other (i.e., non-interposing) methods in the library, since it forwards any requests for those methods to the second instance of the dynamic linking method (i.e., the stock dlsym( ).

System Description

FIG. 1 is a block diagram that schematically shows an example of a host computer 20 configured to intercept all calls to a dynamic library 22, in accordance with an embodiment of the present invention. Host computer 20 may comprise a processor 24, a memory 26 and a storage device 28 that stores dynamic library 22, an interposing library 30, a system library 32, and a software application 34. As described hereinbelow, processor 24 can load dynamic library 22, interposing library 30, system library 32, and software application 34 from the storage device to memory 26. In embodiments herein, upon processor 24 loading and executing software application 34 from memory 26, the software application may comprise and be referred to as a software process.

In the configuration shown in FIG. 1, storage device 28 also stores an operating system 56 that processor 24 can execute upon loading to memory 26. In embodiments described hereinbelow operating system 56 may comprise a LINUX™ distribution. In these embodiments, operating system 56 may be referred to herein as LINUX™ 56.

While FIG. 1 shows dynamic library 22, interposing library 30, system library 32, and software application 34 stored storage device 28, storing these items on remote storage devices is considered to be within the spirit and scope of the present invention. For example, processor 24 can retrieve interposing library 30, system library 32, and software application 34 from a network storage device or a data cloud service.

In the example shown in FIG. 1, dynamic library 22 comprises original methods 36 and 38, interposing library 30 comprises interposing methods 40 and 42, and system library comprises a set of system methods 44.

Original method 36 comprises an original method name 46 storing a text string "FOO1", and original method 38 comprises an original method name 48 storing a text string "FOO2". In embodiments herein, original method 36 may also be referred to simply as ORIGINAL FOO1, and original method 38 may also be referred to simply as ORIGINAL FOO2.

In embodiments described herein, processor 24 may execute an instance of the LINUX™ 56 that manages memory 26 and storage device 28, and also provides services to software application 34 and libraries 22, 30 and 32. In these embodiments, system library 32 may comprise the LIBDL.SO library, and the system library may be referred to herein simply as LIBDL.SO.

System methods 44 in system library 32 comprises a respective system method names 50. In the configuration shown in FIG. 1, the respective system method name for a given system method 44 stores a text string "DLSYM", and the given system method may be referred to herein as ORIGINAL DLSYM or as stock dlsym( ). ORIGINAL DLSYM comprises a method that returns an address of a symbol defined within an object (e.g., dynamic library 22) made accessible through a previous dlopen( ) call. For example, software application 34 may include the following instructions

```
void*libhandle=dlopen ("DYNAMIC_LIBRARY");
void*foo2loc=dlsym(libhandle, "FOO2");
```

where dlopen( ) opens dynamic library 22, and then dlsym ( ) (i.e., ORIGINAL DLSYM) assigns, to the variable foo2loc, the address where ORIGINAL FOO2 is stored in memory 26.

In interposing library 30, interposing method 40 comprises an interposing method name 52 storing a text string "DLSYM", and interposing method 42 comprises an interposing method name 54 storing a text string "FOO1". In embodiments herein, interposing method 40 may also be referred to simply as INTERPOSING DLSYM, and interposing method 42 may also be referred to simply as INTERPOSING FOO1.

In embodiments described hereinbelow, processor 24 can be instructed to preload, to memory 26, interposing library 30 (i.e., prior to loading system library 32), and upon launching (i.e., initiating execution of) software application 34, the software application can instruct the processor to load dynamic library 22. In embodiments where processor 24 executes LINUX™ 56, dynamic library 22 and interposing library 30 may comprise an Executable and Linkable Format (ELF) libraries.

Upon preloading interposing library 30, then loading system library 32, then launching software application 34, and then loading dynamic library 22:

Operating system 56 (executing on processor 24) conveys any calls to dlsym( ) generated by software application 34 (i.e., while executing on the processor) to INTERPOSING DLSYM. In other words, INTERPOSING DLSYM is "visible" to software application 34, but ORIGINAL DLSYM is not visible to the software application.

INTERPOSING DLSYM is associated with dynamic library 22. Therefore, when called by software application 34, INTERPOSING DLSYM can return an address (i.e., in memory 26) for INTERPOSING FOO1, or an address of any additional methods (not shown) in interposing library 30. In embodiments described herein, INTERPOSING DLSYM is not configured to return an address in memory 26 for any of the methods in dynamic library 22 (e.g., original methods 36, 38) or in system library 32 (i.e., system methods 44).

Embodiments described hereinbelow describe a method for INTERPOSING DLSYM to call ORIGINAL DLSYM (even though ORIGINAL DLSYM cannot be directly called from INTERPOSING DLSYM or software application 34, since ORIGINAL DLSYM is not visible to INTERPOSING DLSYM or software application 34). When called, ORIGINAL DLSYM can return an address in memory 26 for (a) original methods 36 and 38 or the address of any additional methods (not shown) in dynamic library 30, and (b) any system method 44 in system library 32.

In typical configurations, software application 34 does not explicitly include an argument that identifies interposing library 30 as a source for any methods. In these configurations, ORIGINAL DLSYM cannot return an address in memory 26 for any of the methods in interposing library 30 (e.g., interposing methods 40 and 42).

In embodiments described herein, ORIGINAL DLSYM and INTERPOSING DLSYM may be referred to as distinct instances of a dynamic linking method that can translate a given method name into an address in memory 26.

Processor 24 comprises a general-purpose central processing unit (CPU) or special-purpose embedded processor, which is programmed in software or firmware to carry out the functions described herein. This software may be downloaded to client computer 20 in electronic form, over a network, for example. Additionally or alternatively, the software may be stored on tangible, non-transitory computer-readable media, such as optical, magnetic, or electronic memory media. Further additionally or alternatively, at least some of the functions of processor 24 may be carried out by hard-wired or programmable digital logic circuits.

Examples of memory 26 and storage device 28 include dynamic random-access memories, non-volatile random-access memories, hard disk drives and solid-state disk drives.

DLSYM Interposition

Figure 2:
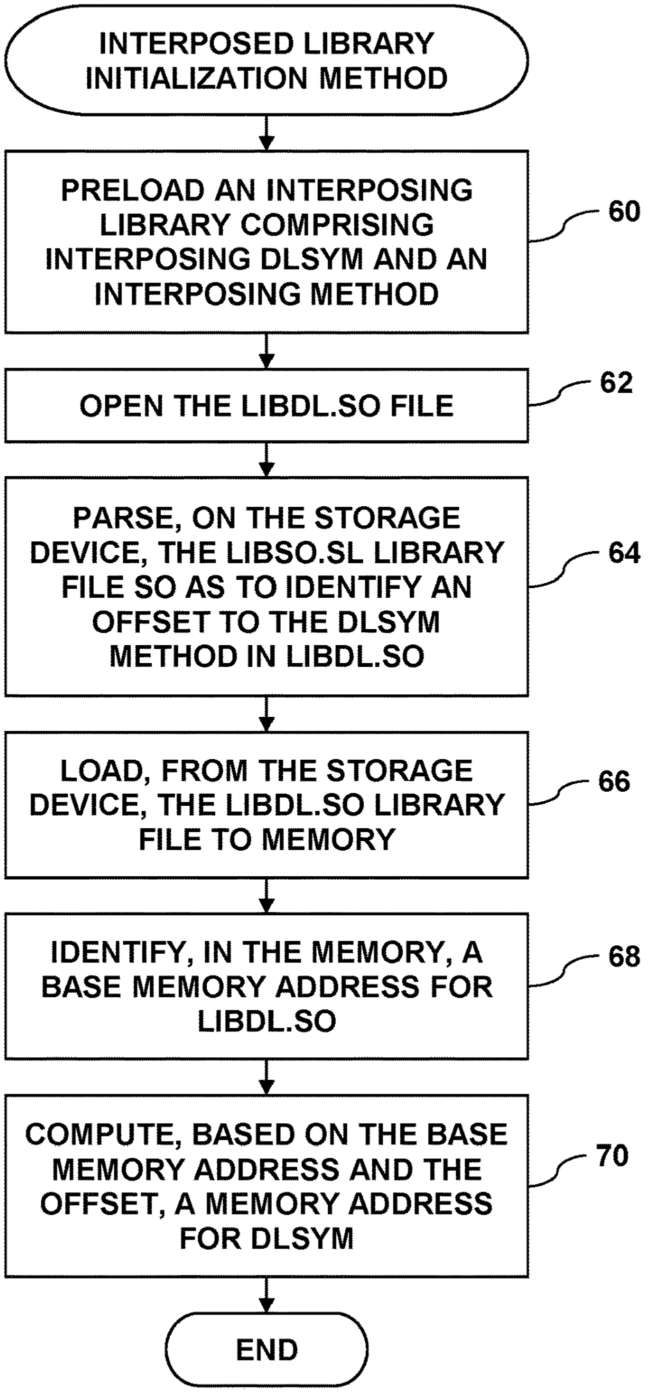
FIG. 2 is a flow diagram that schematically illustrates a method of initializing the preloaded library, in accordance with an embodiment of the present invention.
Figure 3:
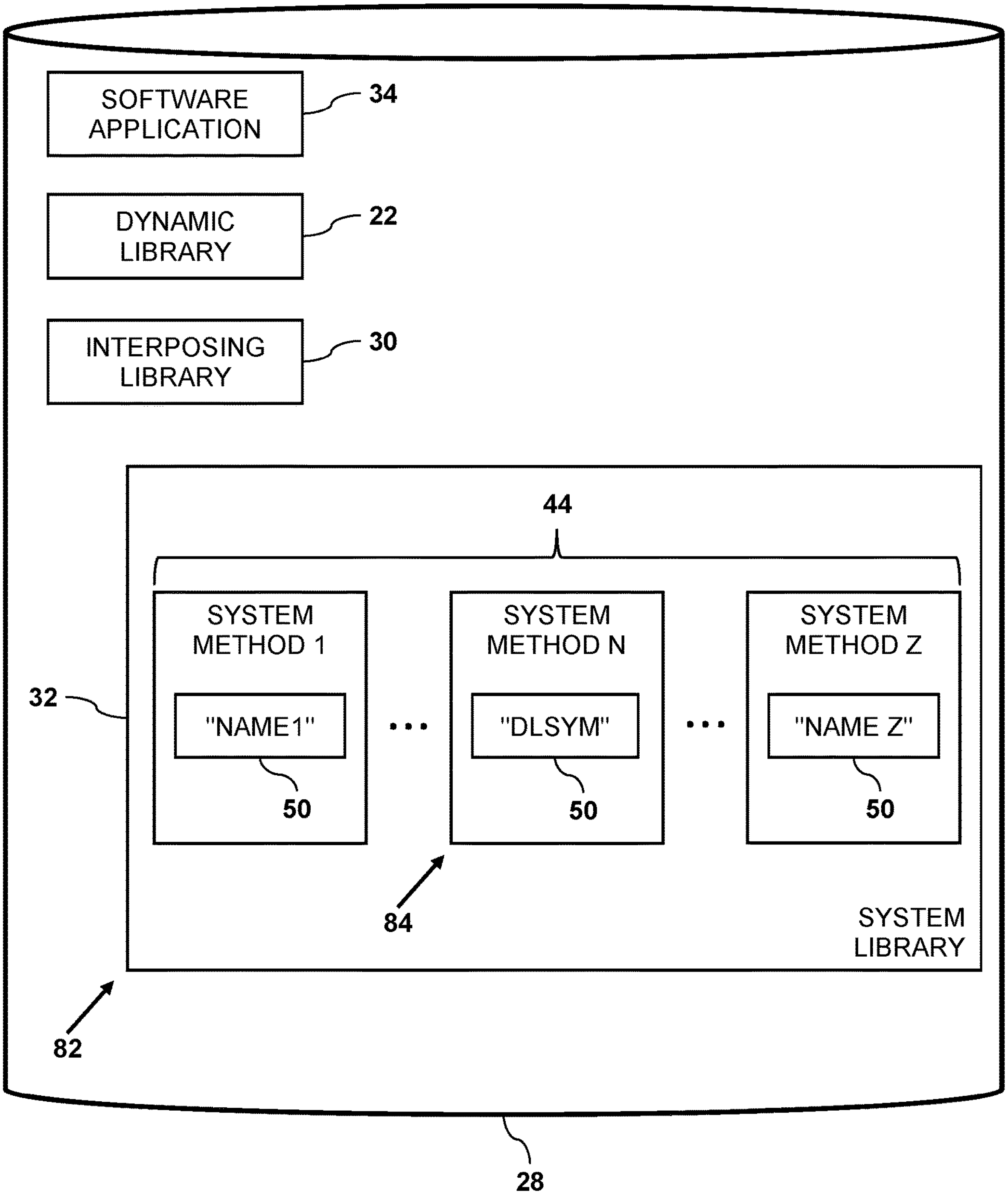
FIG. 3 is a block diagram that schematically shows illustrates components of a system library stored on the storage device, in accordance with an embodiment of the present invention.
Figure 4:
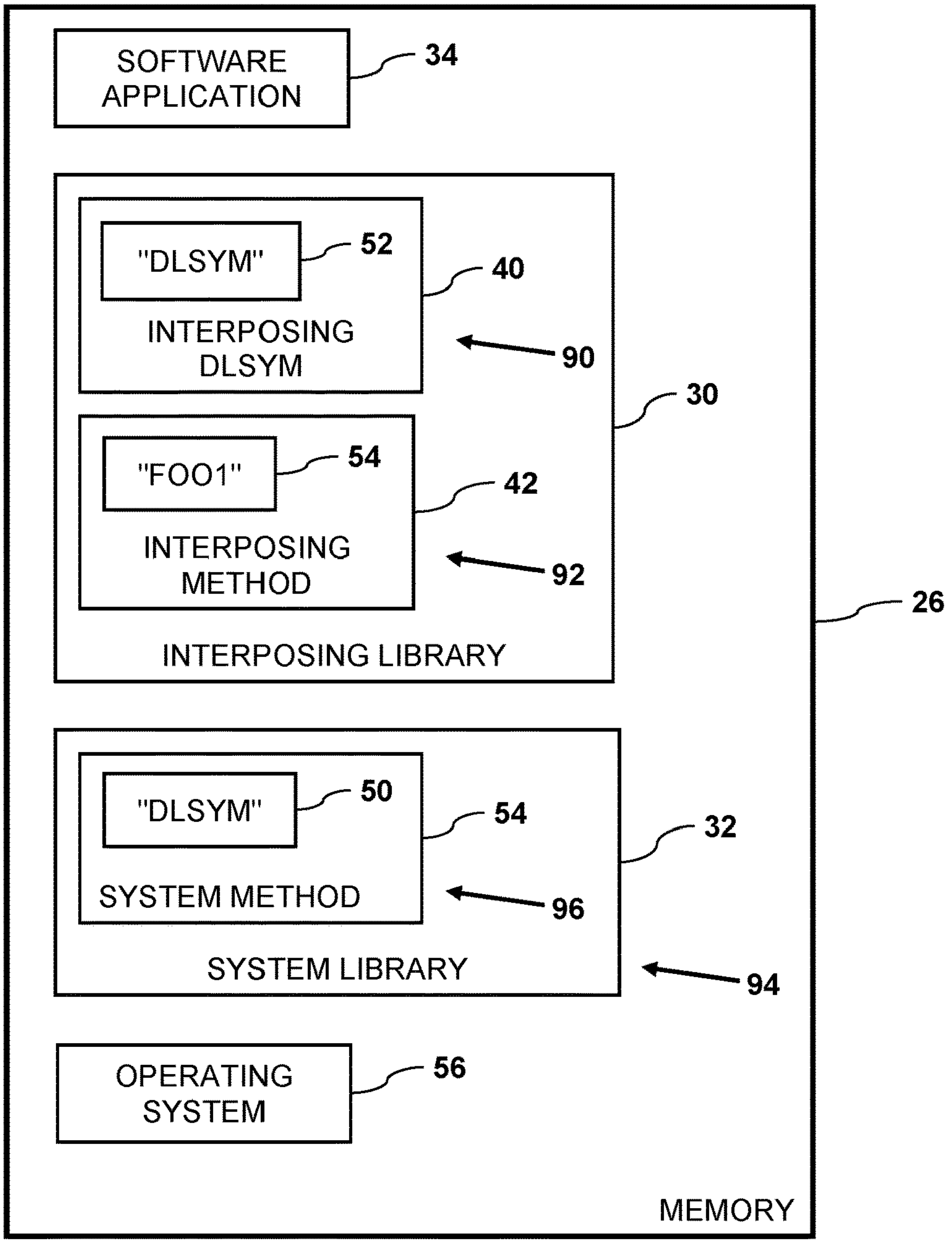
FIG. 4 is a block diagram that schematically illustrates a software application, the preloaded library, and the system library loaded to the memory, in accordance with an embodiment of the present invention.

FIG. 2 is a flow diagram that schematically illustrates a method of initializing INTERPOSING DLSYM by preloading interposing library 30, FIG. 3 is a block diagram that schematically illustrates software application 34 and libraries 22, 30 and 32 stored on storage device 28, and FIG. 4 is a block diagram that schematically illustrates software application 34, and libraries 30 and 32 loaded to memory 26, in accordance with an embodiment of the present invention.

In step 60, processor 24 preloads, from storage device 28, interposing library 30, so as to respectively load INTERPOSING DLSYM and INTERPOSING FOO1 to memory addresses 90 and 92 (FIG. 4) in memory 26. For example, when launching software application 34 in a LINUX™ environment, the ld_preload command can be specified to preload interposing library 30 as follows:

ld_preload=interpose.so./app where the name of the interposing library is interpose.so.

In step 62, processor 24 opens system library 32 (i.e., that is stored on storage device 28) For example in a LINUX™ environment, processor 24 can call the LINUX™ syscall "open( )" to open the system library LIBDL.SO.

In step 64, processor 24 parses (i.e., examines) system library 32 (i.e., the system library file) on storage device 28 so as to compute an offset 84 (i.e., a count of bytes from the beginning of system library 32) for ORIGINAL DLSYM in the system library. In some embodiments, as described supra, system library 32 comprises an ELF library on storage device 28. ELF library files have different sections having respective types such as .dynsym (for type DYNSYM) and dynstr (for type STRTAB). Processor 24 can analyze these two sections so as to find an offset of a symbol (i.e., in the .dynsym section) with a name from the .dynstr string table section.

In step 66, processor 24 loads, from storage device 28, system library 32 to a memory address 96 in memory 26. For example, when launching software application 34 in a LINUX™ environment, the LINUX™ dynamic linker (i.e., loader) loads all dependencies of the application at the very beginning of the execution process of the software application, wherein one of dependencies comprises system library 32 (i.e., LIBDL.SO).

In step 68, processor 24 identifies memory address 94. Memory address 94 comprises a "base address" in memory 26 to which processor 24 loaded system library 32. In a LINUX™ environment, processor 24 can identify memory address 94 by calling system method dladdr and pass the address (in memory 26) of dlopen (as it is a method inside LIBDL.SO.) and receive, in response to the call, the address of the library in .dli_fbase, as shown in the following example:

```
Dl_info info;
::dladdr(::dlopen, &info);
void*address_of_original_libdl=info.dli_fbase;
```

Finally, in step 70, processor 24 computes a memory address 96 by adding offset 84 to memory address 94, and the method ends.

Figure 5:
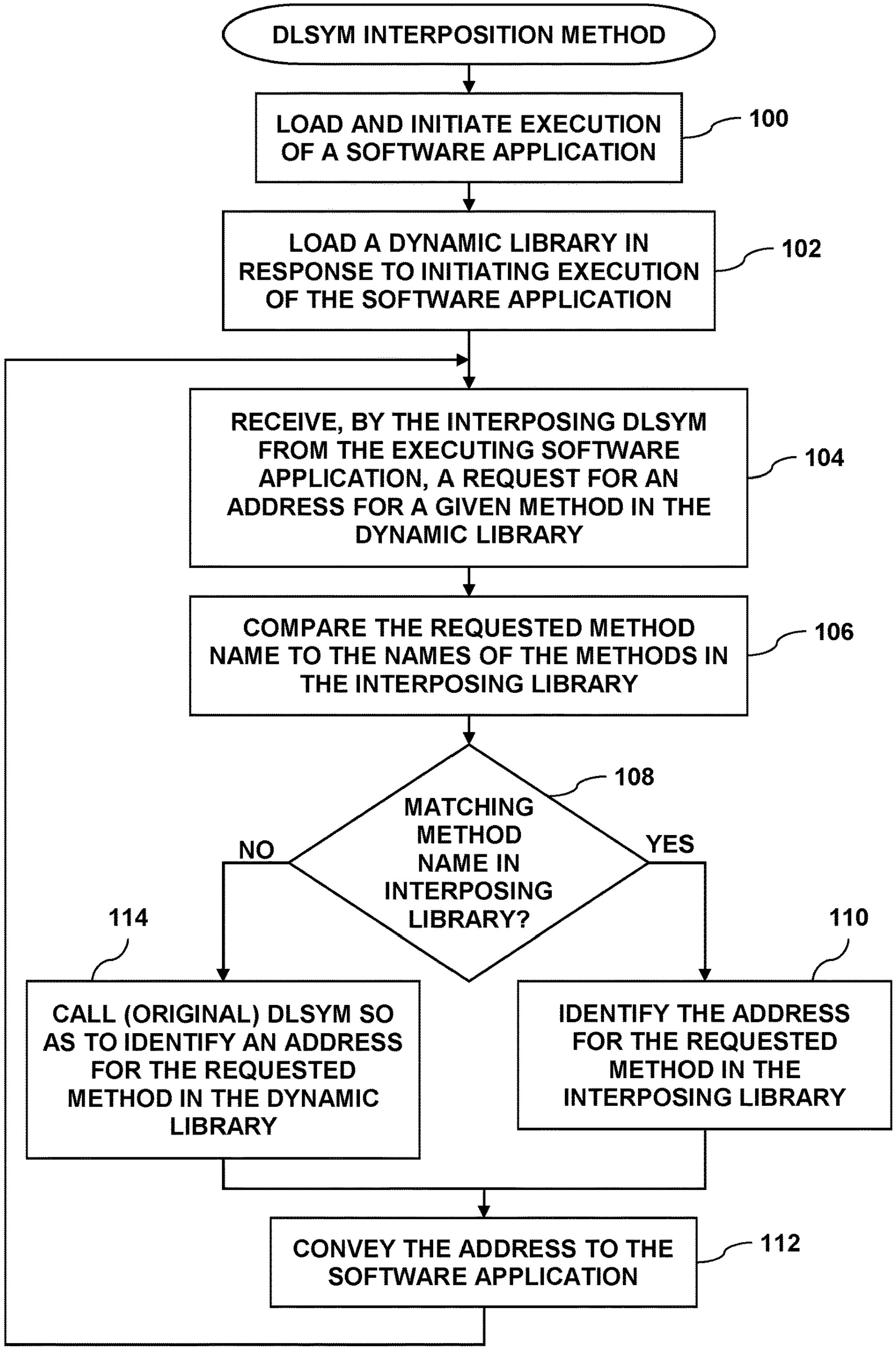
FIG. 5 is a flow diagram that schematically illustrates a method of interposing calls to the dynamic library, in accordance with an embodiment of the present invention.
Figure 6:
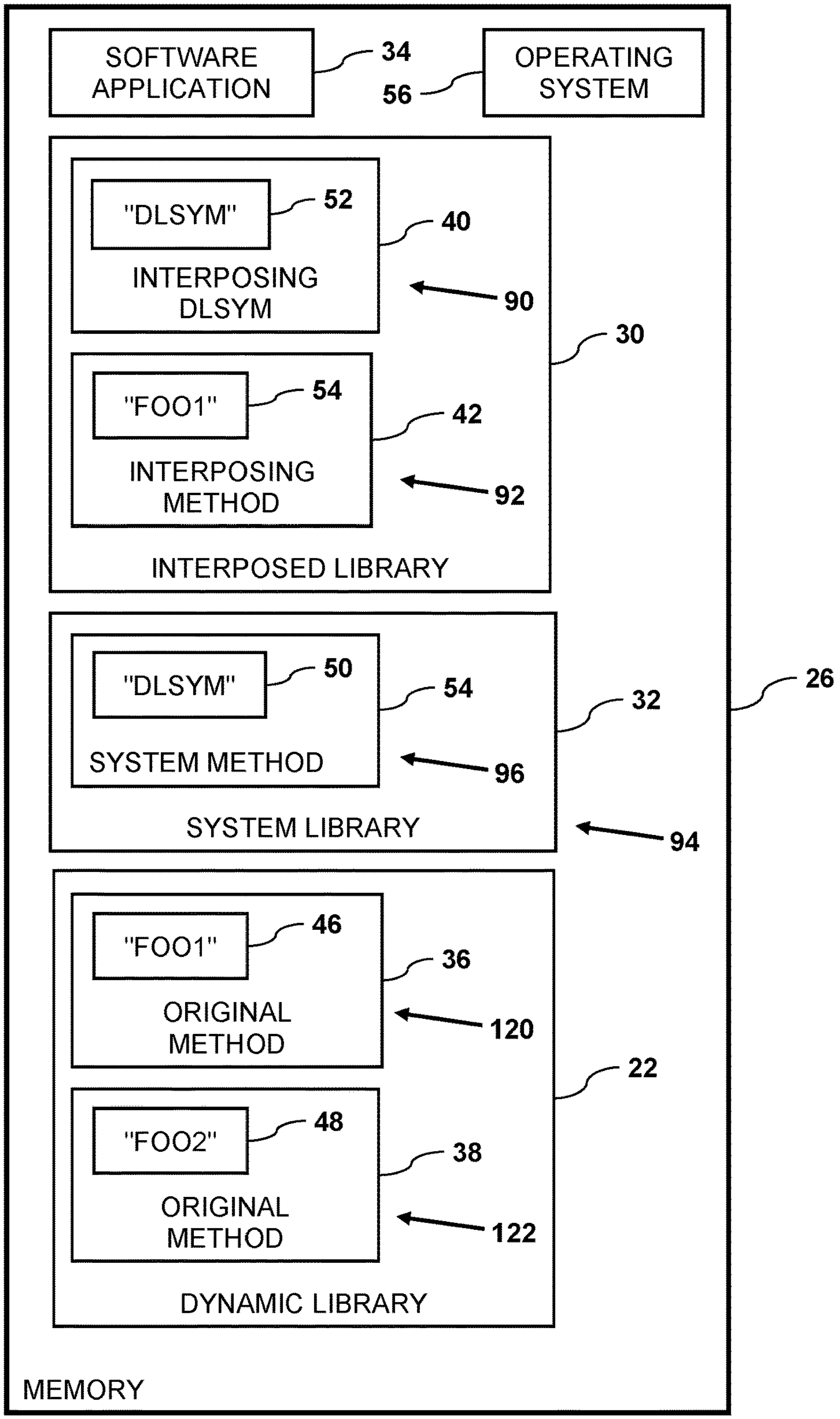
FIG. 6 is a block diagram that schematically the software application, the dynamic library, the preloaded library, and the system library loaded to the memory, in accordance with an embodiment of the present invention.

FIG. 5 is a flow diagram that schematically illustrates a method of interposing calls to method 36 and 38, and FIG. 6 is a block diagram that schematically shows libraries 22, 30 and 32 loaded to memory 26, in accordance with an embodiment of the present invention.

In step 100, processor 24 loads, from storage device 28 to memory 26, software application 34, and initiates execution of the software application.

In step 102, upon loading and initiating execution of software application 34, processor 24 loads dynamic library 22. In one embodiment, processor 24 loads dynamic library 22 by dynamically linking the library to the software application so as to connect the dynamic library to software application 34. In another embodiment, processor 24 loads dynamic library 22 by dynamically loading the dynamic library so as to connect the dynamic library to software application 24.

In the example shown in FIG. 6, processor 24 loads dynamic library 22 by loading original method 36 to an address 120 in memory 26, and then loading original method 38 to an address 122 in memory 26.

In step 104, INTERPOSING DLSYM receives (i.e., intercepts), from software application 34, a request for an address (i.e., in memory 26) of a given (i.e., intended) method in dynamic library 22 that processor 24 previously loaded (e.g., in response to LINUX™ 56 receiving a dlopen( ) call). In some embodiments, the request comprises a text string comprising a specified name of the given method, where the specified name matches one of the original method names (i.e., original method name 46 or 48) for one of the methods in dynamic library 22. For example, to convey the request, software application 34 can generate function call dlsym (libandle, "FOO1")

to request an address in memory 26 for original method 36 (i.e., the method named "FOO1", or generate function call dlsym (libandle, "FOO2")

to request an address in memory 26 for original method 38 (i.e., the method named "FOO2").

In step 106, INTERPOSING DLSYM compares the request (i.e., the text string parameter in the received dlsym ( ) function call) to the name(s) of the method(s) in interposing library 30. In the example shown in FIG. 1, INTERPOSING DLSYM compares the text string parameter in the received dlsym( ) function call to method name 52.

In step 108, if processor 24 detects that the text string parameter in the received dlsym( ) call matches one of the method names in interposing library 30, then in step 110, INTERPOSING DLSYM identifies an address in memory 26 for the method corresponding to the matched method name. For example, if the text parameter in the received dlsym( ) call comprises "FOO1", INTERPOSING DLSYM detects that "FOO1" matches interposing method name 54, and identifies address 92 in response to detecting the match.

In step 112, INTERPOSING DLSYM conveys the identified address in memory 26 to software application 34 in response to the request received in step 104, thereby directing the software application to the identified address, and the method continues with step 104.

Returning to step 108, if processor 24 detects that the text string parameter in the received dlsym( ) call does not match any the method names in interposing library 30, then in step 114, INTERPOSING DLSYM calls ORIGINAL DLSYM so as to identify an address for the method in dynamic library 22 that corresponds to the text string parameter in the received dlsym( ) call, and the method continues with step 112.

The following is an example of code that can be used to call ORIGINAL DLSYM:

```
void * interpose__dlsym(char * symbol)
{
if (strcmp(symbol, "foo") == 0)
return interfosed__foo;
return original__dlsym(symbol);
}
```

In some embodiments, processor 24 can execute this code obtain an address of any method in any library that ORIGINAL DLSYM was called for. Examples of these libraries include interposing library 30, a "global" pseudo library handle (i.e. RTLD_DEFAULT) or any system library 32 (e.g. LIBDL.SO).

In one example, if the received text string parameter comprises "FOO2", then INTERPOSING DLSYM generates and conveys function call return original_dlsym (handlex, "FOO2" to dlsym2( ) (i.e., ORIGINAL DLSYM). In response to this call, dlsym2( ) returns address 122. In another example, the received text string may correspond to a method name (not shown) in system library 32. In this example, dlsym2( ) can return an address in memory 26 of the method in system library 32 corresponding to the received text string parameter.

In the following example, a developer wants to test a software application that requires having a license on the disk and want to cause it to read another license file for testing. To implement this functionality, the developer can create an interposing version of the LINUX™ system function open( ) as follows:

```
// int open(char * name)
int interposing_open(char * name)
{
printf("application tried to open file %s\n", name);
if (strcmp(name, "license.txt") == 0) {
name = "dummy_license.txt";
}
return original_open(name);
}
void * dlsym(char * symbol)
{
if (strcmp(symbol, "open") == 0) {
return interposing_open;
}
return original_dlsym(symbol);
}
```

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for controlling operation of a computer that stores a library of original methods, which have respective method names and are for dynamic loading by a software application running on the computer, the method comprising:

loading, to respective first addresses in a memory of the computer, one or more interposing methods having respective ones of the method names;

identifying a second address in the memory of an original dynamic linking method that is associated with the library and is configured to dynamically link dynamic libraries to the software application;

intercepting, by an interposing dynamic linking method configured to dynamically link dynamic libraries to the software application, a request from the software application, the request specifying one of the method names;

comparing the specified method name, by the interposing dynamic linking method, to the method names of the interposing methods; and directing the software application, by the interposing dynamic linking method, based on the comparing, such that:

provided one of the interposing methods has the specified method name, the software application is directed to one of the first addresses so as to run the interposing method having the specified method name, but when none of the interposing methods has the specified method name, the software application is directed to the second address so as to run the original dynamic linking method to run the original method having the specified method name, such that the original method can be run even without the interposing dynamic linking method having any information about the original method.

2. The method according to claim 1, and further comprising loading, from a storage device, the interposing methods prior to loading the library of original methods.

3. The method according to claim 1, wherein the library comprises an Executable and Linkable Format (ELF) library.

4. The method according to claim 1, wherein the intercepted request comprises a dlsym( ) call.

5. The method according to claim 1, and further comprising loading, from a storage device, a system library comprising the original dynamic linking method prior to loading the library of original methods.

6. The method according to claim 5, wherein identifying the second address comprises computing an offset of the original dynamic linking method in the system library on the storage device, identifying, in the memory, a base address for the loaded system library, and adding the offset to the base address.

7. The method according to claim 5, wherein the system library comprises libsdl.so, and wherein the original dynamic linking method comprises dlsym( ).

8. The method according to claim 1, wherein running the interposing method comprises calling, with one or more parameters, the original method having the identical original method name, receiving a result from the called original method, and performing an operation on the received result.

9. The method according to claim 8, wherein the operation comprises profiling the original method.

10. The method according to claim 8, wherein the operation comprises debugging the original method.

11. The method according to claim 8, wherein the operation comprises instrumenting the original method.

12. The method according to claim 8, wherein the operation comprises adding functionality to the original method.

13. The method according to claim 1, further comprising loading an interposing library, which includes the interposing dynamic linking method and the interposing methods, to the memory prior to launching the software application.

14. The method according to claim 13, further comprising loading a system library, which includes the original dynamic linking method, to the memory after loading the interposing library and prior to launching the software application.

15. The method according to claim 13, wherein loading the interposing library comprises loading the interposing library using an ld_preload( ) call.

16. The method according to claim 1, wherein the original dynamic linking method and the interposing dynamic linking method are respective instances of dlsym( ).

17. An apparatus, comprising:

a computer, comprising:

a storage device configured to store a library of original methods, which have respective method names and are for dynamic loading by a software application running on the computer;

a memory storing program instructions; and a processor configured, by executing the program instructions:

to load, to respective first addresses in the memory of the computer, one or more interposing methods having respective ones of the method names, to identify a second address in the memory of an original dynamic linking method that is associated with the library and is configured to dynamically link dynamic libraries to the software application, to intercept, by an interposing dynamic linking method configured to dynamically link dynamic libraries to the software application, a request from the software application, the request specifying one of the method names, to compare the specified method name, by the interposing dynamic linking method, to the method names of the interposing methods, and to direct the software application, by the interposing dynamic linking method, based on the comparing, such that:

provided one of the interposing methods has the specified method name, the software application is directed to one of the first addresses so as to run the interposing method having the specified method name, but when none of the interposing methods has the specified method name, the software application is directed to the second address so as to run the original dynamic linking method to run the original method having the specified method name, such that the original method can be run even without the interposing dynamic linking method having any information about the original method.

18. A computer software product comprising a non-transitory computer-readable medium in which program instructions are stored, which program instructions, when read by a processor of a computer that stores a library of original methods, which have respective method names and are for dynamic loading by a software application running on the computer, cause the processor:

to load, to respective first addresses in a memory of the computer, one or more interposing methods having respective ones of the method names;

to identify a second address in the memory of an original dynamic linking method that is associated with the library and is configured to dynamically link dynamic libraries to the software application;

to intercept, by an interposing dynamic linking method configured to dynamically link dynamic libraries to the software application, a request from the software application, the request specifying one of the method names;

to compare the specified method name, by the interposing dynamic linking method, to the method names of the interposing methods; and to direct the software application, by the interposing dynamic linking method, based on the comparing, such that:

provided one of the interposing methods has the specified method name, the software application is directed to one of the first addresses so as to run the interposing method having the specified method name, but when none of the interposing methods has the specified method name, the software application is directed to the second address so as to run the original dynamic linking method to run the original method having the specified method name, such that the original method can be run even without the interposing dynamic linking method having any information about the original method.

* * * * *